United States Patent
Brown et al.

(10) Patent No.: US 7,223,447 B2
(45) Date of Patent: May 29, 2007

(54) METHOD OF COATING WELDED TUBES

(75) Inventors: Curtis R. Brown, Crete, IL (US);
Theodore H. Krengel, Flossmore, IL (US)

(73) Assignee: IDOD Systems, LLC, Grant Park, IL (US)

( * ) Notice: Subject to any disclaimer, the term of this patent is extended or adjusted under 35 U.S.C. 154(b) by 0 days.

(21) Appl. No.: 11/190,033

(22) Filed: Jul. 26, 2005

(65) Prior Publication Data
US 2006/0035027 A1      Feb. 16, 2006

Related U.S. Application Data

(60) Provisional application No. 60/591,990, filed on Jul. 29, 2004.

(51) Int. Cl.
*H05B 6/02* (2006.01)
*B05D 3/06* (2006.01)
*B05D 7/22* (2006.01)

(52) U.S. Cl. ............... 427/543; 427/591; 427/230; 427/231; 427/239; 427/374.1; 427/374.4; 427/374.5

(58) Field of Classification Search ............ None
See application file for complete search history.

(56) References Cited

U.S. PATENT DOCUMENTS

| | | | | |
|---|---|---|---|---|
| 5,618,591 A | * | 4/1997 | Bernstein, Jr. | 427/544 |
| 6,042,659 A | * | 3/2000 | Brown et al. | 148/519 |
| 6,290,786 B1 | * | 9/2001 | Brown et al. | 148/519 |

* cited by examiner

*Primary Examiner*—William Phillip Fletcher, III
(74) *Attorney, Agent, or Firm*—Howard & Howard Attorneys, P.C.

(57) ABSTRACT

Method of coating the seam of a welded tube with an adherent metal coating, including applying a nonadherent metal coating to the inside and outside of the welded seam, externally heating the seam area with the seam located in the lower portion of the tube to generally the melting temperature of the coating, then applying a fluid coolant to the external surface to freeze the outer coating while continuing heating to melt the coating on the inner surface and finally quenching. In one preferred embodiment, the tube is heated with an induction heater including a seam coil which first heats the seam area below the melting temperature of the coating and then heated with a full body coil. The coolant may be chilled water or other coolant which is sprayed onto the seam area.

19 Claims, 1 Drawing Sheet

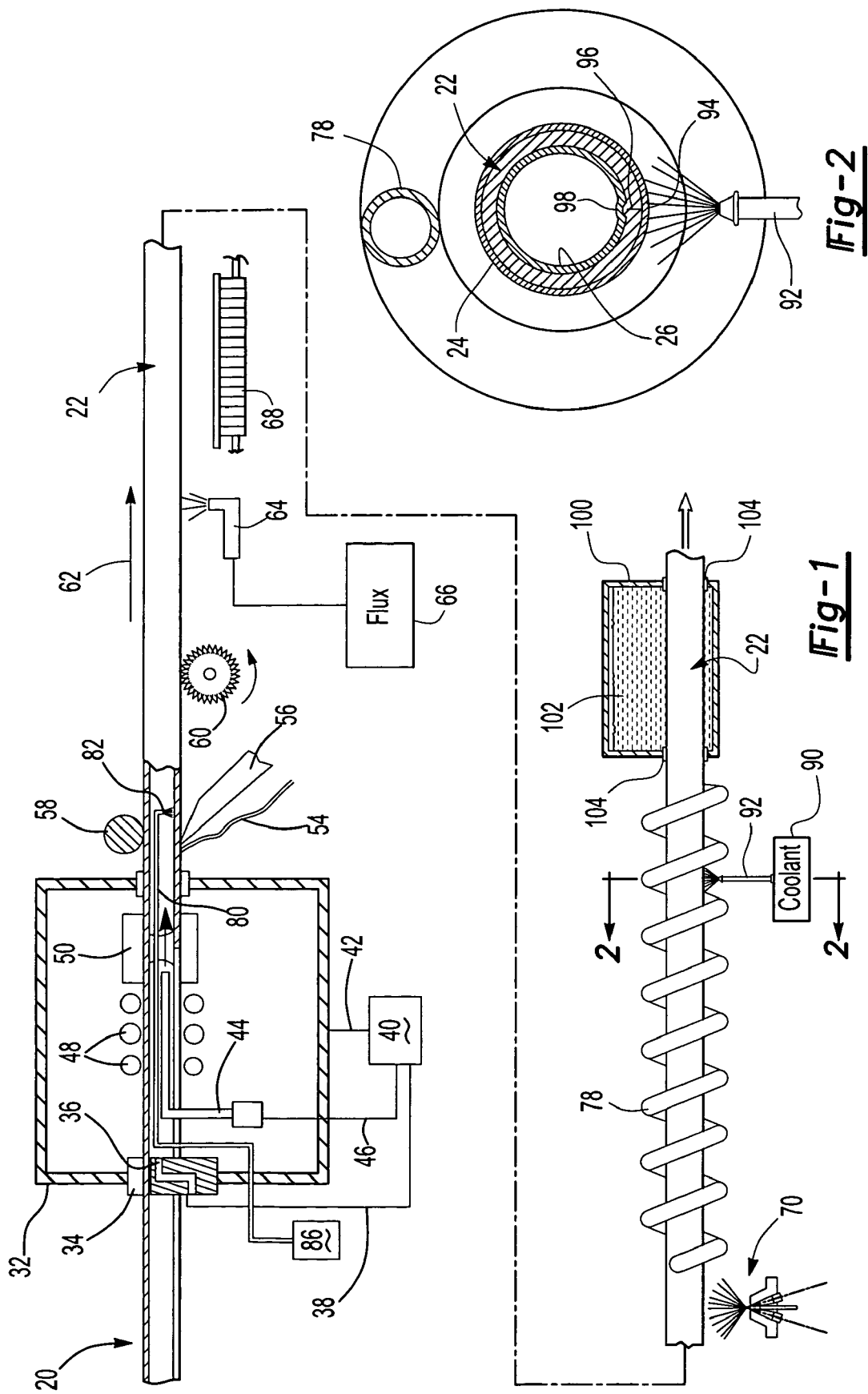

METHOD OF COATING WELDED TUBES

RELATED APPLICATION

The present application claims priority to U.S. Provisional Application Ser. No. 60/591,990, filed Jul. 29, 2004.

FIELD OF THE INVENTION

The present invention relates to a method of coating welded metal tubes, particularly including the welded seam with a protective metal coating including, but not limited to zinc, aluminum and their alloys.

BACKGROUND OF THE INVENTION

Ferrous metal tubes or pipes are commonly coated with a protective metal coating, such as zinc, referred to as galvanizing, aluminum, and alloys of zinc and aluminum, including Galvalume®, a trademark of BIEC International, Inc. In a typical application, a metal strip, referred to as a "skelp," is first coated with a protective metal coating, the strip is then rolled into a tubular shape or an open seam tube and the opposed lateral edges of the open seam tube are then welded in a continuous process typically by heating the opposed lateral edges with an induction coil, melting the adjacent edges and the opposed lateral edges are then driven together or forged, forming a continuous welded seam. Where the strip is formed of steel, for example, the adjacent lateral edges of the open seam tube are heated to the melting temperature of steel, which is 2,300° F. or greater, whereas the melting temperature of the protective metal coating is substantially less. For example, a typical galvanized coating has a melting temperature of about 780° F. and aluminum has a melting temperature of about 1,200° F. Thus, the protective metal coating of the tube at and adjacent the welded seam will burn off or vaporize leaving the welded seam unprotected. Most precoated ferrous metal tubes or pipes fail by corrosion of the welded seam. Thus, an object of this invention is to provide a continuous method of applying an adherent protective metal coating to the internal and external surfaces of a welded seam of a metal tube and a method of coating the internal and external surfaces of a metal tube including the welded seam area with an adherent protective metal coating.

U.S. Pat. No. 6,042,659 assigned to the assignee of this application discloses a method of coating the external surface of a welded seam with an adherent protective metal coating, wherein a flux is first applied to the external surface of the welded seam, the seam area is then preheated, a protective metal coating is then applied over the exterior surface of the welded seam by thermal spraying, and the metal tube and the weld area is then heated in a full body induction coil, heating the welded seam to a temperature equal to or greater than the melting temperature of the protective metal coating, melting the protective metal coating over the external surface of the welded seam.

U.S. Pat. No. 6,290,786, also assigned to the assignee of this application, discloses a method of coating the internal surface of the welded seam of a metal tube by applying a paste of a particulate or powdered protective metal coating and a liquid flux over the internal surface of the welded seam, then preheating the welded seam to a temperature less than the melting temperature of the protective metal coating, followed by heating the metal tube and the welded seam with a fully body induction coil, thereby heating the protective metal coating on the interior surface of the welded seam to its melting temperature, melting the protective metal coating over the internal surface of the welded seam as described above. The metal tube is then quenched, freezing the protective metal coating and forming an adherent protective metal coating on the interior surface of the welded seam.

A problem with the methods of coating the welded seam of a metal tube as described in the above-referenced patents, particularly when used in combination, is that the exterior heating of the welded seam, as by induction heating, results in melting of the protective metal coating on the exterior surface of the welded seam before the protective metal coating on the interior surface reaches the melting temperature. The protective metal coating on the exterior surface of the welded seam then leaks or drips under gravity, which results in a roughened surface, and may result in insufficient coating on the exterior surface of the welded seam. The protective metal coating which drips from the exterior surface of the welded seam may also foul the induction heater and requires cleanup. Attempts have been made to reduce this problem by using a lower frequency induction heater to reduce the dwell or soak time and thus reduce dripping. The higher the frequency of the induction heater, the lower the penetration of the heat through the metal tube. For example, an induction heater having a frequency of 3,000 Hz results in heating the metal tube to a "depth" of 0.042 inches, whereas an induction heater having a frequency of 1,000 Hz heats the tube to a depth of 0.073 inches and an induction heater having a frequency of 500 Hz heats the metal tube to a depth of 0.10 inches. Thus, lowering the frequency of the induction heater would be desirable, particularly for metal tubes or pipes having a wall thickness of greater than the induction frequency penetration. Finally, external heating of the welded seam, including induction heating, results in spreading of the heat from the welded seam as the dwell time or soak increases, resulting in greater loss of the protective metal coating from the outer surface of the metal pipe adjacent the welded seam.

There has therefore been a long felt need to eliminate the problems associated with the methods of applying an adherent protective metal coating to the internal and external surfaces of a metal tube or pipe, particularly including the welded seam, which eliminates the problems set forth above.

SUMMARY OF THE INVENTION

As set forth above, this invention relates to a continuous method of applying an adherent protective metal coating to the internal and external surfaces of a metal tube or pipe, particularly including the internal and external surfaces of the welded seam. The tube or pipe may be formed of any metal, particularly including, but not exclusively, ferrous metals, such as steel. As will be understood by those skilled in this art, the protective metal coating will depend upon the application. For example, the protective metal coating may be a galvanized or zinc coating, aluminum or aluminum and zinc alloys, including Galvalume®, which is an alloy of zinc and aluminum having about 55 weight percent aluminum, but may also include other protective coatings. In-line galvanizing and coating or painting processes which apply a protective metal coating to a tube or pipe are also well known. A metal strip may be galvanized or painted on one or both surfaces prior to forming and welding which, as described above, results in melting and vaporization of the zinc coating on the exterior surface of the weld during the welding process. The outer surface of the tube may also be coated following welding by immersing the tube in a zinc bath following welding which coats only the outer surface in an inline process. However, the continuous method of this invention eliminates the requirement for a zinc bath. In one preferred embodiment of the method of this invention, the opposed sides of a metal strip are first coated with a protective metal coating. The metal strip is then continuously rolled into an open seam tube having adjacent lateral edges and the edges of the strip are then welded by conventional means, such as heating the opposed lateral edges of the open seam tube with an induction heater to the melting temperature of the metal tube and "forged" by driving the edges together in a continuous process, forming a metal tube having a welded seam. As described in the above-referenced U.S. patents, the edges of the metal tube are preferably scarfed prior to welding to remove the protective metal coating from adjacent the weld area and the process is preferably carried out in a "non-oxidizing atmosphere" or more preferably a "reducing atmosphere" to avoid contamination of the weld area with oxides and alloys of the metal tube and the protective metal coating. As thus far described, the method of coating the internal and external surfaces of a welded metal tube may be conventional. Further, as described in the above-referenced patents, the welded seam of the metal tube is preferably located in the lower portion of the tube prior to or after welding, such that the protective metal coating applied to the interior and exterior surfaces of the welded seam by the method of this invention does not flow downwardly away from the welded seam following melting.

The method of applying an adherent protective metal coating to the internal and external surfaces of the welded seam of this invention then includes applying a first protective metal coating to an external surface of the welded seam of a continuously moving metal tube and applying a second protective metal coating to an internal surface of the welded seam of the continuously moving metal tube. As will be understood by those skilled in this art, the protective metal coatings applied to the internal and external surfaces of the welded seam are preferably, but not necessarily, the same protective metal coating applied to the surfaces of the metal strip such that the method of this invention forms a continuous adherent protective metal coating covering the entire interior and exterior surfaces of the welded metal tube, including the interior and exterior surfaces of the welded seam. Further, as described in the above referenced U.S. patents, the protective metal is preferably applies as an adherent costing bonded to the tube.

The method of this invention then includes exteriorly heating the welded seam preferably by induction heating, but other methods may be used. As described above, external heating of the welded seam first heats the first protective metal coating on the exterior surface of the welded seam to its melting temperature, melting the first protective metal coating over the exterior surface of the welded seam, then applying a fluid coolant such as water to the first protective metal coating on the exterior surface of the welded seam while continuing to externally heat the welded seam, thereby freezing the first protective metal coating on the exterior surface of the welded seam and forming an adherent protective metal coating on the exterior surface of the welded seam. As will understood, freezing the protective metal coating on the exterior surface of the welded seam eliminates leaking or dripping of the protective metal coating on the exterior surface of the welded seam and permits the use of a longer soak or dwell time for continued external heating of the welded seam to melt the second protective metal coating on the internal surface of the welded seam, or the use of an induction heater having a lower frequency and thus the use of the method of this invention for metal tubes or pipes having a thickness greater than 0.065 inches. However, as will be understood by those skilled in this art, the preferred frequency of an induction heater will be dependent upon the wall thickness of the tube and thus this invention is not limited to the wall thickness.

The method of this invention then includes continuing to externally heat the welded seam, thereby heating the second protective metal coating on the internal surface of the welded seam, melting the second protective metal coating over the internal surface of the welded seam and quenching of the metal tube, thereby freezing the protective metal coating on the internal surface of the welded seam and forming a good adherent coating on both the internal and external surfaces of the welded seam which is metallurgically bonded to the metal tube. In a preferred embodiment of the method of this invention, wherein the welded seam is heated by induction heating, the continued induction heating following freezing of the protective metal coating on the exterior surface of the welded seam, results in inducing heat through the tube wall, melting the protective metal coating on the interior surface of the welded seam.

As set forth above, one preferred method of externally heating the welded seam is by induction heating the external surface of the welded seam. However, as described in the above-referenced U.S. patents, one preferred method of this invention includes first externally heating or preheating the welded seam with an induction seam coil to a first temperature less than the melting temperature of the protective metal coating, then externally heating the welded seam with a full body induction coil surrounding the metal tube to the melting temperature of the coating. As described above, however, the method of this invention may utilize induction heaters having a lower frequency or by increasing the length of the full body induction coil, increasing the "soak" time, thereby permitting the use of the method of this invention for metal pipes, for example, having a thickness of greater than 0.065 inches, and eliminating the problems associated with this method, including melting and dripping of the protective metal coating on the exterior surface of the welded seam prior to melting of the protective metal coating on the interior surface of the welded seam. The fluid coolant may be any suitable fluid coolant and may depend upon the protective metal coating utilized. For a galvanized or zinc coating, for example, chilled water may be preferred, which may be sprayed by one or more spray nozzles directed between the coils of the full body induction coil following melting of the protective metal coating on the exterior surface of the welded seam, thereby freezing the protective metal coating on the exterior surface of the welded seam while continuing to externally heat the metal tube including the welded seam in the full body induction coil to the melting temperature of the protective metal coating on the interior surface of the welded seam. It has been found that increasing the length of the induction coil thereby increasing the dwell time, and utilizing a lower frequency results in a superior adherent protective metal coating on the interior and exterior surfaces of the welded seam by the method of this invention, particularly including, for example, metal pipes having a thickness greater than 0.065 inches. It should be understood, however, that using a low frequency induction heater or increasing the length of the induction heating are alternative solutions and thus may be used separately.

As described in the above-referenced U.S. patents, a preferred method of applying a protective metal coating to the exterior surface of the welded seam is by thermal spraying molten droplets of the protective metal coating on the exterior surface of the welded seam following the initial heating or preheating of the welded seam by an induction coil seam heater, wherein the seam is first heated to a temperature less than the melting temperature of the protective metal coating. However, as described, this method of applying a protective metal coating to the exterior surface of the welded seam does not result in a metallurgical bond of the protective metal coating on the exterior surface of the welded seam without heating the protective metal coating to its melting temperature, such as by use of a full body induction coil. A plurality of full body coils may also be used. A preferred method of applying a protective metal coating to the interior surface of the welded seam is by applying a powder or particulate coating of the protective metal coating, preferably with a liquid flux, forming a paste of particulate protective metal coating and flux. However, the methods of applying the protective metal coating to the interior and exterior surfaces of the welded seam prior to melting are not limited to the methods described in the above-referenced patents.

The method of coating the interior and exterior surfaces of a metal tube of this invention, including the interior and exterior surfaces of the welded seam, thus eliminate the problems associated with the prior art, particularly including the problem of melting the protective metal coating on the exterior surface of the welded seam prior to melting of the protective metal coating on the interior surface of the welded seam described above. One preferred embodiment of the method of this invention will now be described with reference to the drawings. However, as will be understood by those skilled in this art, the methods of this invention are not limited to the disclosed embodiment and various modifications may be made within the purview of the appended claims.

BRIEF DESCRIPTION OF THE DRAWINGS

FIG. 1 is a side schematic view of an apparatus for performing the method of this invention; and FIG. 2 is a side cross-sectional view of FIG. 1, in the direction of view arrows 2—2.

DESCRIPTION OF THE PREFERRED EMBODIMENTS

As disclosed in the above-referenced U.S. patents, the disclosure of which is incorporated herein by reference, in a typical tube forming mill, a flat metal strip or skelp is received by the mill, such as a metal strip formed of a ferrous metal, such as steel or iron. However, the method of this invention is not limited to ferrous tubes, but may also include any metal tube, including brass or copper. The metal strip is typically supplied to the tube forming mill in coils mounted on a payout reel (not shown), which is treated, cleaned and rolled by conventional means into an open seam tube 20. However, in a conventional tube forming mill, the open end of the tube is located at the top of the open seam tube and is welded with the seam located in the top rather than the bottom, as shown in FIG. 1. In a preferred embodiment of the method of this invention, the strip is first coated with a protective metal coating on both surfaces of the strip and the protective metal coating is then preferably removed from adjacent the lateral edges of the strip, prior to welding, for the reasons set forth above and in the above-referenced U.S. patents.

In one preferred embodiment of the coating method of this invention, the open seam 20 is welded in a non-oxidizing or reducing atmosphere and it is advantageous to maintain the non-oxidizing atmosphere within the interior of the tube to promote reflow of the protective metal coating over the interior surface of the welded seam. This may be accomplished by enclosing the weld area within an enclosure 32 and injecting non-oxidizing or reducing gas into the interior of the tube. As used herein, a non-oxidizing gas or atmosphere refers to a gas or atmosphere which eliminates, prevents or inhibits oxidation of the molten metal including the molten edges of the tube and the coating, such as argon. The non-oxidizing gas may also include a reducing gas, such as hydrogen, wherein the reducing gas reacts with the metal oxides formed on the metal strip at elevated temperatures, thereby effectively removing oxides from the strip surface in preparation for reflow of the metal coating. The non-oxidizing gas may also keep the metal oxides from forming at elevated temperatures. Thus, the non-oxidizing gas or atmosphere may be relatively inert, such as nitrogen or an inert gas, such as argon, but may also include a reducing gas, such as hydrogen or hydrogen may be used as the non-oxidizing gas. A typical non-oxidizing gas may thus include argon and hydrogen alone or in combination. The atmosphere of the enclosure 32 should also be kept from reaching chemical equilibrium by allowing the non-oxidizing gas to escape the enclosure, preferably past the open ends of the strip.

In the disclosed embodiment of the method of this invention, the open seam tube 20 is received through a gas seal 34 having an inner plug (not shown) which may be formed of a friction resilient material. A gas port 36 extends from the support portion of the plug body having an outlet which injects a non-oxidizing gas into the open seam tube 20. Line 38 receives a non-oxidizing gas from source 40. Line 42 is also connected to the source of non-oxidizing gas 40 to inject the non-oxidizing gas into the enclosure 32. Finally, non-oxidizing gas may be injected into impeder 44 through line 46. Thus, in the disclosed embodiment of the apparatus, the interior and exterior of the tube 20 are maintained in a non-oxidizing gas atmosphere during welding. The exterior of the welded tube 22 may also be enclosed (not shown) within a non-oxidizing atmosphere.

The open seam tube may be welded by any conventional welding method while preferably maintaining a non-oxidizing atmosphere as described. In the disclosed embodiment, the welding apparatus includes a work coil 48 which is connected to a source of high frequency alternating current (not shown). The work coil 48 creates a strong magnetic field which in turn induces current in the open seam 20 tube adjacent the work coil 48. In the disclosed embodiment, an impeder 44 extends upwardly between the opposed adjacent edges of the open seam tube 20. A conventional induction welding impeder typically consists of a non-metallic tube surrounding one or more ferrite rods (not shown). Water or mill coolant is typically circulated over and past the ferrite rods to remove the heat produced the magnetic hysteresis and eddy current losses. At the frequency commonly used for induction welding (typically 200 to 800 kHz), current flows around the tube and along the "Vee" formed by the approaching edges of the open seam tube 20, heating the edges to a hot forging temperature where the edges are at least partially melted. As will be understood by those skilled in this art, ferrous tubes are also being welded at lower frequencies down to 60 kHz. The lower the frequency, the wider the zone of the tube is heated and thus it is preferable to limit the zone heated above the melting temperature of the coating to reduce coating loss. The edges are then forged together by squeeze rolls 50, one of which is shown in FIG. 1, thereby forming an integral welded seam 22 including welding flashes. Where the strip is steel, for example, the temperature of the edges of the strip will reach 2,300° F. to 2,600° F. or greater during the welding step, thereby melting and vaporizing any protective metal coating, such as zinc, aluminum and their alloys having a melting temperature of about 780° F. at or adjacent the weld area. Further, as described above, an alloy of the metal tube and the protective metal coating may form during welding which inhibits formation of an adherent protective metal coating on the welded seam area and thus, as described above, it is desirable to remove the protective metal coating from the lateral edges of the metal strip prior to welding.

The outer flash may then be removed with a scarfing tool 56, as shown in FIG. 1, which conventionally includes a backup roller 58, as shown. In a typical application, the flash 54 on the exterior of the tube may be more easily removed by the scarfing tool while the weld area is relatively hot and the tube may then be quenched (not shown) to a much lower temperature, preferably below the melting temperature of the protective metal coating. The requirement for a quench will depend upon the speed and length of the line. However, the temperature of the welded tube is preferably reduced to a temperature of less than the melting temperature of the protective metal coating and may be reduced to ambient before wire brushing by wire brush 60 which removes an additional layer of potentially oxidized metal which may be detrimental to the application of an additional protective metal coating and reflow. The wire brush 60 may be rotated in a counterclockwise direction, as shown, to also remove the oxide layer and the welded tube may be enclosed in a non-oxidizing atmosphere (not shown) as described above.

A non-adherent protective metal coating is then applied to the interior and exterior surfaces of the welded seam and the weld area by any suitable means. As disclosed in the above-referenced U.S. Pat. No. 6,042,659, a spray nozzle 64 may be used to direct a fine mist of a suitable flux onto the external surface of the weld area. The flux 64 is connected to a source of liquid flux 66. A suitable flux containing zinc chloride, such as Zaclon flux, available from Zaclon Company. The flux is sprayed or misted onto the exterior surface of the welded seam and the adjacent area, such as by blowing the flux with air or preferably a non-oxidizing gas creating a fine spray or mist. The flux reduces any oxides at the exterior surface of the welded seam and provides a surface which will more readily receive the metal coating, which is to follow.

In the disclosed embodiment of the method of this invention, the exterior surface of the weld area is then heated or preheated to a temperature less than the melting temperature of the protective metal coating by an induction heater or seam coil 68, such as a conventional induction seam heater. In the disclosed method the weld area is preferably preheated to a temperature less than the melting temperature of the protective metal coating to preheat the weld area, such as 200° F. to 600° F. or more preferably between 500° F. and 600° F. for a protective metal coating formed of zinc. The temperature may be greater where the melting temperature of the protective metal coating is greater than the melting temperature of zinc, such as aluminum or a zinc aluminum alloy. Although preheating the welded seam is preferred, it is also optional in the method of this invention.

A non-adherent protective metal coating is also applied to the exterior surface of the welded seam as by thermal spraying atomized molten metal onto the preheated exterior surface of the welded seam area. In the disclosed embodiment of the method of this invention and as described in the above-referenced U.S. Pat. No. 6,042,659, the thermal spray apparatus 70 is a conventional two wire arc thermal spray apparatus, wherein consumable electrodes of the coating material are fed into the thermal spray gun, an electric arc is struck across the approaching ends of the electrodes, melting the ends of the electrodes, and a gas is fed through the thermal spray gun, atomizing the molten metal, which is then sprayed onto the exterior surface of the area of the welded seam. Conventional two wire arc thermal spray apparatus of this type are commercially available from a number of sources. It is believed, however, that other thermal spray apparatus would also be suitable for this method.

As set forth above, a non-adherent protective metal coating is also applied to the interior surface of the welded seam which may be applied by the methods disclosed in the above-referenced U.S. patents, particularly the above-referenced U.S. Pat. No. 6,290,786. In the disclosed embodiment, a particulate or fine powdered metal coating material is conveyed through wand 80 to a nozzle 82 located downstream of the welding enclosure 32. The wand 80 is connected by a line to a source of powdered coating material 86. In one preferred embodiment, the powdered coating material is mixed with a liquid flux forming a paste of powdered coating material and flux over the interior surface of the welded seam and adjacent area as disclosed in detail in the above-referenced U.S. Pat. No. 6,290,786.

The next step of the method of applying an adherent protective metal coating to the interior and exterior surfaces of the welded seam is to externally heat the welded seam first to the melting temperature of the protective metal coating on the exterior surface of the welded seam. In this embodiment of the method of this invention, the welded seam has been preheated by the induction seam coil 70, as described above, and then directing the welded tube through a full body induction coil 78 thereby heating the welded seam to the melting temperature of the protective metal coating. However, as described above, the full body induction coil 78 will first heat the exterior surface of the welded seam to its melting temperature prior to melting the protective metal coating on the interior surface of the welded seam, resulting in loss of protective metal coating on the exterior surface of the welded seam and leaking or dripping of the melted protective metal coating on the exterior surface of the welded seam and forming a roughened surface.

This problem is solved by the method of this invention by applying a fluid coolant to the exterior surface of the welded seam upon melting of the protective metal coating on the exterior surface of the welded seam to freeze the metal coating on the exterior surface of the welded seam while continuing to heat the welded seam to melt the protective metal coating on the interior surface of the welded seam as now described. In the disclosed embodiment, a coolant, such as chilled water, is sprayed from a source 90 through nozzle 92 onto the exterior surface of the welded seam as shown in FIG. 2, freezing the protective metal coating 94 on the exterior surface of the welded seam 96 while continuing to heat the welded seam with the full body induction coil 78 and continuing to heat the welded seam until the protective metal coating 98 on the interior surface of the welded seam 96 melts and flows over the interior surface of the welded seam 96 as shown in FIG. 2. In one preferred embodiment of the method of this invention, wherein the final heating step is conducted in a full body inductive coil 78, the coolant is sprayed by a nozzle 92 or a plurality of nozzles (not shown) between the coils of the full body coil 78 as shown in FIG. 1. The coolant may be applied to the exterior surface of the welded seam by any suitable means following melting of the protective metal coating on the exterior surface of the welded seam, but is most easily applied by spraying. As shown in FIG. 1, the coolant way be sprayed by nozzle 92 near, but spaced from the end of the full body induction coil, following melting of the protective metal coating on the exterior surface of the weld seam, which is located at or near the bottom of the welded tube 22. The apparatus may also include a plurality of nozzles 92, depending upon the application. It will also be understood that the welded seam may initially be located at the top of the tube, but the tube may then be turned or twisted to locate the weld near the bottom of the tube during coating.

As shown in FIG. 2, the welded tube 22 includes a protective metal coating 24 on the exterior surface of the welded tube 22 and a protective metal coating 26 on the interior surface of the welded tube 22 which may be applied to the metal strip prior to forming and welding as described above. As also described above, the protective metal coating 94 applied to the exterior surface of the welded seam 96 and the protective metal coating 98 applied to the interior surface of the welded seam 96 are preferably, but not necessarily the same protective metal coating and is also the same protective metal coatings 24 and 26 applied to the exterior and interior surfaces of the strip, such that the protective metal coatings form a continuous coating on the interior and exterior of the welded tube 22.

In the disclosed embodiment, the final step of the method of this invention is to quench the coated metal tube 22 as shown schematically in FIG. 1. The quench tank 100 may contain a conventional quenching liquid, such as water, and preferably includes seals 104 as is known in this art. The quenching of the coated tube 22 freezes the protective metal coating 98 on the interior of the welded seam 96. It has been found that heating the non-adherent protective metal coating to its melting temperature and freezing the coatings in place results in a good metallurgical bond between the protective metal coatings and the metal tube 22. Further, the method of this invention permits the use of an induction heater, such as the full body coil 78, having a lower frequency, such as 500 to 1000 Hz, thus improving the heat penetration of the induction heating without resulting in loss of the protective metal coating 94 on the exterior surface of the welded seam 96 because the method of this invention results in freezing of the coating as described. Alternatively, or in combination, the length of the full body induction coil 78 may be increased or a plurality of induction coils may be used to increase the dwell time of the tube in the induction coil. This significantly increases the application of the method of this invention, including the use of the method of this invention for metal tubes or pipes having a thickness of greater than the induction heater frequency penetration. In the disclosed embodiment, the frequency of the full body induction coil 78 may be reduced to 1,000 Hz or 500 Hz or less, resulting in greater heat penetration and melting of the protective metal coating 98 on the interior surface of the welded seam 96 with metal tubes having a substantially greater thickness. In the disclosed embodiment, the induction seam heater 68 may have a length, for example, of between 15 and 20 inches and the full body induction heater 78 may have a length of between 40 and 60 inches for example, or a plurality of full body induction coils may be used, resulting in efficient heating of the protective metal coating 98 on the internal surface of the welded seam 96.

As will be understood by those skilled in this art, various modifications may be made to the method of this invention within the purview of the appended claims. More specifically, various means may be utilized to exteriorly heat the welded seam area of the metal tube other than induction heating, particularly the combination of the induction seam heater 68 and the full body coil 78. A single induction coil or seam coil or a plurality of both may, for example, be used to exteriorly heat the welded seam. Further, various coolants may be applied to the protective metal coating 94 on the exterior surface of the welded seam 96 including, for example, liquid or near liquid carbon dioxide gas. Other gaseous and liquid coolants may also be used and the preferred coolant may depend upon the application. Further, as set forth above, any suitable method of welding the seam of the open seam tube 20 may be utilized. Having described a preferred embodiment of the method of coating the internal and external surfaces of a welded tube of this tube, the invention is now claimed as follows.

The invention claimed is:

1. A continuous method of applying an adherent protective metal coating to internal and external surfaces of a welded seam of a metal tube, comprising the following steps:

applying a first protective metal coating to an external surface of a welded seam of a continuously moving metal tube;

applying a second protective metal coating to an internal surface of said welded seam of said continuously moving metal tube;

externally inductive heating said welded seam, first heating said first protective metal coating on said external surface of said welded scam to its melting temperature, melting said first protective metal coating over said external surface of said welded seam;

applying a fluid coolant to said first protective metal coating on said external surface of said welded seam, while continuing to externally heat said welded seam, thereby freezing said first protective metal coating on said external surface of said welded seam, forming an adherent protective coating on said external surface of said metal seam;

continuing externally inductive heating said welded seam, heating said second protective metal coating on said internal surface of said welded seam, melting said second protective metal coating over said internal surface of said welded seam; and quenching said metal tube.

2. The method as defined in claim 1, wherein said method includes first externally heating said welded seam with an induction seam coil to a first temperature less than a melting temperature of said first and second protective metal coatings, then externally heating said metal tube and said welded seam with a full body induction coil surrounding said metal tube and applying said fluid coolant on said first protective metal coating on said exterior surface of said welded seam while continuing to heat said welded seam in said full body induction coil.

3. The method as defined in claim 2, wherein said method includes spraying said fluid coolant through coils of said full body induction coil.

4. The method as defined in claim 1, wherein said method includes spraying said fluid coolant on said first protective metal coating on said exterior surface of said welded seam.

5. The method as defined in claim 1, wherein said method includes applying said first protective metal coating by thermal spraying a molten first protective metal coating on said exterior surface of said welded seam.

6. The method as defined in claim 1, wherein said method includes applying said second protective metal coating by applying a metal in particulate form to said internal surface of said welded seam.

7. The method as defined in claim 6, wherein said method includes applying a paste of particulate metal and a liquid flux to said internal surface of said welded seam forming a paste of said second protective metal coating and liquid flux.

8. The method as defined in claim 1, wherein said method is performed with said welded seam located in a lower portion of said metal tube.

9. A method of applying an adherent protective metal coating to internal and external surfaces of a welded seam of a metal tube, comprising the following steps:

applying a first protective metal coating to an external surface of a welded seam of a continuously moving metal tube with said welded scam located in a lower portion of said metal tube;

applying a second protective metal coating to an internal surface of said welded seam of said continuously moving metal tube;

externally heating said welded sewn with an induction heater, first heating said first protective metal coating on said exterior surface of said welded seam to its melting temperature, melting said first protective metal coating over said exterior surface of said welded seam;

applying a fluid coolant to said first protective metal coating on said exterior surface of said welded seam while continuing to externally heat said welded seam with an induction heater, thereby freezing said first protective metal coating on said exterior surface of said welded seam, forming an adherent protective metal coating on said exterior surface of said welded seam;

continuing to externally heat said welded seam with an induction heater, heating said second protective metal coating on said internal surface of said welded scam, melting said second protective metal coating over said interior surface of said welded seam; and quenching said metal tube, thereby freezing said second protective metal coating on said internal surface of said welded seam and forming an adherent protective metal coating on said interior surface of said metal seam.

10. The method as defined in claim 9, where said method includes first externally heating said welded seam with an induction seam coil to a first temperature less than a melting temperature of said first and second protective metal coatings, then externally heating said metal tube and said welded seam with a full body induction coil surrounding said metal tube and applying said fluid coolant on said first protective metal coating on said exterior surface of said welded seam while continuing to heat said metal tube and said welded seam with said full body induction coil.

11. The method as defined in claim 10, wherein said method includes spraying said fluid coolant through coils of said full body induction coil.

12. The method as defined in claim 9, wherein said method includes spraying said fluid coolant on said first protective metal coating on said exterior surface of said welded seam as said welded seam is externally heated.

13. The method as defined in claim 9, wherein said method includes applying said first protective metal coating by thermal spraying a molten protective metal coating on said exterior surface of said welded seam.

14. The method as defined in claim 9, wherein said method includes applying a paste of particulate metal and a liquid flux to said internal surface of said welded seam forming said second protective metal coating.

15. A method of coating the internal and external surfaces of a welded metal tube including a welded seam, comprising the following steps:

applying a protective metal coating to both sides of a metal strip;

rolling said metal strip, forming a tube and welding opposed edges of said tube, forming a welded seam;

applying said protective metal coating over an exterior surface of said welded seam;

applying said protective metal coating over an interior surface of said welded seam;

externally heating said welded seam with an induction heater with said welded seam located in a lower portion of said tube, first heating said protective metal coating on said external surface of said welded seam to a melting temperature of said protective metal coating, melting said protective metal coating over said external surface of said welded seam;

applying a fluid coolant to said protective metal coating on said external surface of said welded seam while continuing to externally heat said welded scam, thereby freezing said protective metal coating on said external surface of said welded seam, forming an adherent protective metal coating on said external surface of said welded seam;

continuing to heat said welded seam with an induction heater, heating said protective metal coating on said internal surface of said welded sewn, melting said protective metal coating over said internal surface of said welded seam; and quenching said tube, thereby freezing said protective metal coating on said internal surface of said welded seam and forming an adherent protective metal coating on said interior surface of said welded seam.

16. The method as defined in claim 15, wherein said method includes first externally heating said welded seam with an induction seam coil to a first temperature less than a melting temperature of said protective metal coating, then externally heating said welded seam with a full body induction coil surrounding said metal tube and applying said fluid coolant on said protective metal coating on said external surface of said welded seam, freezing said protective metal coating on said external surface of said welded seam while continuing to externally heat said tube and said welded seam with said fully body induction coil.

17. The method as defined in claim 15, wherein said method includes applying said protective metal coating on said exterior surface of said metal seam by thermal spraying a molten protective metal coating on said exterior surface of said welded seam.

18. The method as defined in claim 15, wherein said method includes applying said protective metal coating on said interior surface of said welded seam by applying a metal in particulate form.

19. The method as defined in claim 15, wherein said method includes applying a paste of particulate metal and a liquid flux to said internal surface of said welded seam forming said protective metal coating over said interior surface of said welded seam.

* * * * *

UNITED STATES PATENT AND TRADEMARK OFFICE
CERTIFICATE OF CORRECTION

| | | |
|---|---|---|
| PATENT NO. | : 7,223,447 B2 | Page 1 of 1 |
| APPLICATION NO. | : 11/190033 | |
| DATED | : May 29, 2007 | |
| INVENTOR(S) | : Curtis R. Brown and Theodore H. Krengel | |

It is certified that error appears in the above-identified patent and that said Letters Patent is hereby corrected as shown below:

In column 11, line 17, please delete the word "scam" and insert the word --seam--.

In column 11, line 22, please delete the word "sewn" and insert the word --seam--.

In column 11, line 36, please delete the word "scam" and insert the word --seam--.

In column 12, line 24, please delete the word "scam" and insert the word --seam--.

In column 12, line 31, please delete the word "sewn" and insert the word --seam--.

Signed and Sealed this

Twenty-first Day of August, 2007

JON W. DUDAS
*Director of the United States Patent and Trademark Office*